No. 611,469. Patented Sept. 27, 1898.
W. A. FOWLER.
PLANTER.
(Application filed June 13, 1898.)
(No Model.)
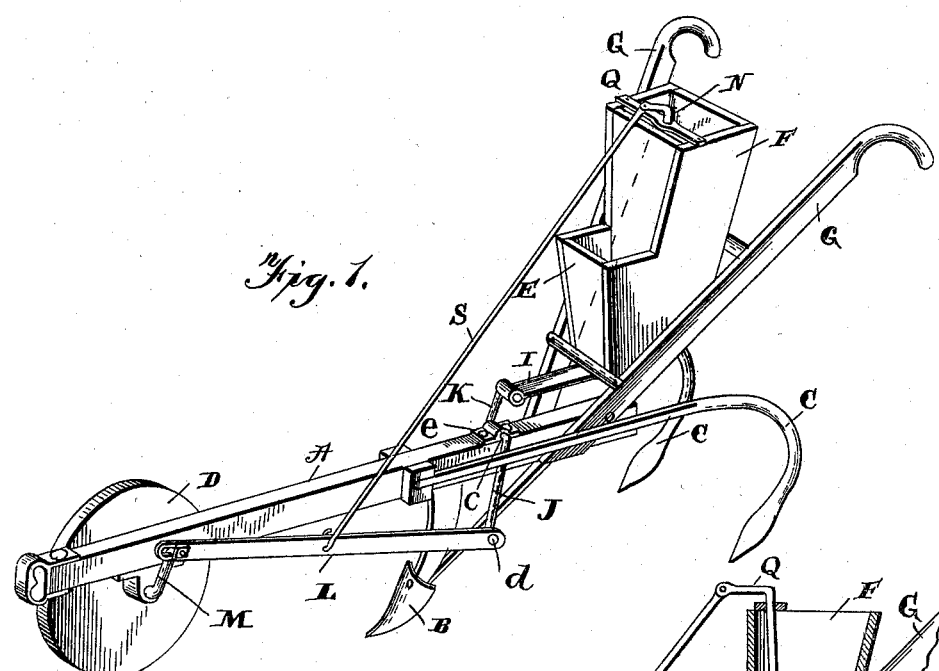
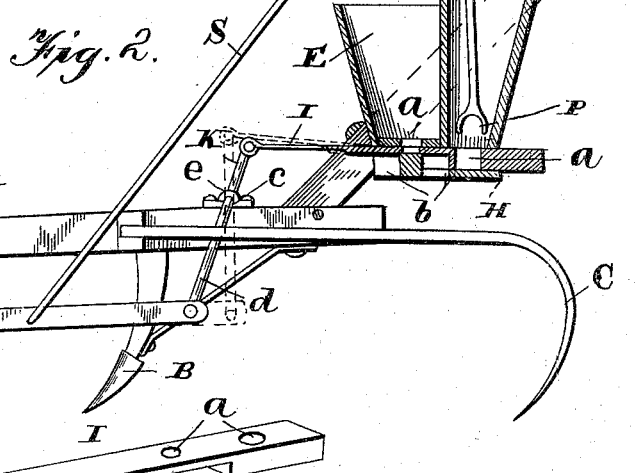
Witnesses
Geo. E. Frech
B. E. Seitz
Inventor
Wm. A. Fowler,
by A. S. Pattison,
Attorney.
THE NORRIS PETERS CO., PHOTO-LITHO., WASHINGTON, D. C.

UNITED STATES PATENT OFFICE.

WILLIAM A. FOWLER, OF CARRUTH, GEORGIA.

PLANTER.

SPECIFICATION forming part of Letters Patent No. 611,469, dated September 27, 1898.

Application filed June 13, 1898. Serial No. 683,321. (No model.)

*To all whom it may concern:*

Be it known that I, WILLIAM A. FOWLER, a citizen of the United States, residing at Carruth, in the county of Madison and State of Georgia, have invented new and useful Improvements in Planters, of which the following is a specification.

My invention relates to improvements in planters, and pertains to a planter constructed to plant the seed and supply the fertilizer; and it consists in the construction and arrangement of parts, which will be fully described hereinafter and particularly referred to in the claims.

The object of my invention is to provide a planter of the construction hereinafter shown and described whereby the seed and fertilizer boxes are supported by the handles, with their bottoms in a plane above the plow or cultivator beam, and the operating mechanism constructed to actuate a feeding-slide and also a stirrer for the fertilizer.

In the accompanying drawings, Figure 1 is a perspective view of a planter embodying my invention. Fig. 2 is an enlarged vertical sectional view taken through the hoppers, with the slide in position thereunder. Fig. 3 is a detached perspective view of the bent operating-lever and the seed-slide.

Referring now to the drawings, A is the beam of the planter, B an opener-plow, and C covering-teeth or cultivators situated on opposite sides of the beam and in rear of the opener B and also in rear of the dropping-point of the hoppers, as will presently appear more fully.

Journaled at the front end of the beam A is an operating-wheel D of any desired construction, which is adapted to engage the surface of the ground and to be revolved by contact therewith.

E is a seed-hopper, and F a fertilizer-hopper, the forward wall of the hopper F serving as the rear wall of the hopper E and formed in such fashion as here shown, the front hopper E being considerably shorter than the rear hopper F. These hoppers are supported by the handles G, with their bottoms a considerable distance above the horizontal plane of the beam A, as clearly shown. The bottom H of the hoppers is provided with a slideway for the feeding-valve I, the said feeding-valve I being provided with the two openings $a$, adapted to register with openings $b$, which are in the bottom of the hoppers, and to receive a given quantity of seed and fertilizer, respectively, and to drop them therefrom upon the ground, as will be readily understood. This valve I is supported by its slideway, and it projects forward a considerable distance and over and above the beam A.

A bent operating-lever J is journaled to the upper side of the beam, the upper end K of this lever being U-shaped in front or rear elevation, the upper wall of the U being pivotally connected with the forward end of the slide. This slide has its outer end made flexible, so that it will give up and down in the rocking movement of the lever. The lower wall $c$ of the U-shaped upper end K of the lever extends transverse and rests upon the upper face of the beam and is held in position by a staple $e$, whereby it may have a rocking movement thereon. A pitman L has its rear end connected with the lower end $d$ of the lever, and the forward end of this pitman is connected with a crank-arm M of the driving-wheel D. By this construction as the driving-wheel is rotated the feeding-valve I is reciprocated, and the feeding of the fertilizer and the seed is accomplished at a point in front of the covering-teeth or plows C.

For the purpose of agitating the fertilizer within the hopper F, thus making it loose, so that it will readily feed, I provide this hopper with a vertically-journaled rod N adjacent its front wall, the lower end of the rod being provided with the fork P and the upper end of the rod provided with a crank-arm Q. A rod S has its lower end connected with the pitman L and its upper end connected with the crank-arm Q of the rod N, whereby as the pitman is operated the rod N is rotated.

From the above description it will be seen that I have provided a simple construction for effecting the feeding of seed and fertilizer at the same time.

Having thus described my invention, what I claim, and desire to secure by Letters Patent, is—

1. A planter comprising a beam, the handles, a hopper supported by the handles with its bottom in a plane above the upper face of the beam, and an operating-lever intermediately pivoted to the beam one end projecting thereabove and connected directly with a slide-valve, an operating-wheel carried by the beam, and a pitman connecting the wheel and the lever, substantially as described.

2. A planter comprising a beam, the handles, a hopper supported by the handles with its bottom in a plane above the upper face of the beam, an operating-wheel at the forward end of the beam carrying a crank, a sliding valve at the bottom of the hopper projecting forward over and above the upper face of the beam, and a lever having its upper end U-shaped, the lower wall of the U shape journaled to the beam and its upper wall connected with the slide-valve, and a pitman connecting the lower ends of the lever and the crank-arm of the operating-wheel, substantially as described.

3. A planter comprising a supporting-frame, a hopper, a driving-wheel, a crank pivoted intermediate its ends, and a slide-valve in the lower end of the hopper having a projecting flexible end connected with one end of the operating-lever, and a pitman connecting the opposite end of the operating-lever and the operating-wheel, substantially as described.

4. A planter comprising a beam, the handles, two hoppers supported by the handles one in rear of the other, the rear hopper projecting above the forward hopper, the forward hopper adapted to contain seed and the rear hopper to contain fertilizer, a slide-valve passing through the lower end of the hoppers and common to both of said hoppers, the forward end of the slide-valve projecting over and above the beam, a lever intermediately pivoted to the beam having its upper end connected with the forward end of the slide, an operating-wheel, and a pitman connecting the operating-wheel and the lower end of the said lever, substantially as described.

5. A planter comprising a beam, the handles, two hoppers supported by the handles with their bottoms above the plane of the beam, a driving-wheel, a forwardly-projecting slide-valve for the lower end of the hoppers, a lever pivoted to the beam having its upper end connected with the slide-valve, a pitman connecting the operating-wheel and the opposite end of the lever, a rod vertically journaled within the fertilizer-hopper with its lower end adjacent the lower end thereof, the upper end of the rod provided with a crank-arm, and a rod connecting the pitman and the crank-rod, substantially as described.

In testimony whereof I have hereunto set my hand in the presence of two subscribing witnesses.

WILLIAM A. FOWLER.

Witnesses:
L. E. BROOKS,
R. J. SORRELLS.